Oct. 1, 1957   R. D. BRITE   2,807,907
FISHING FLOAT
Filed July 3, 1956
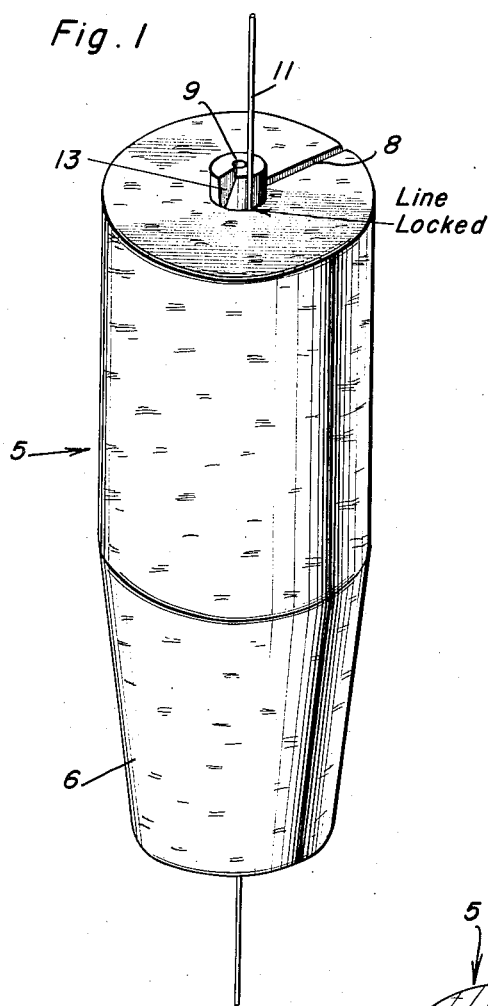
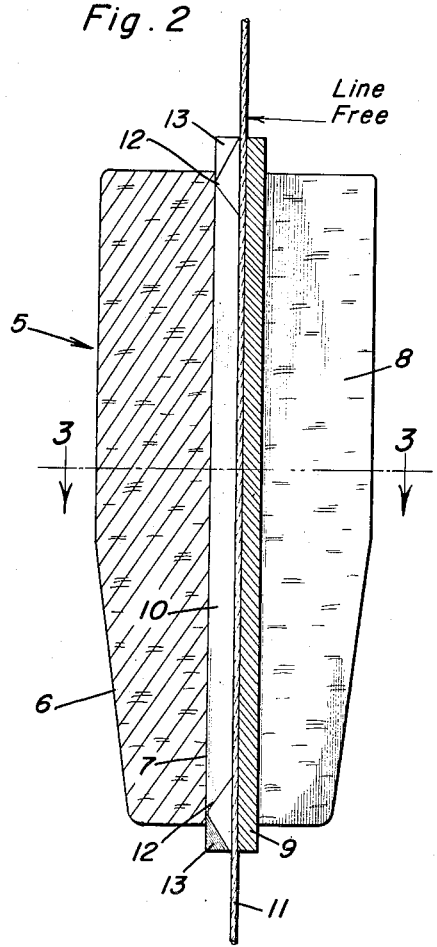
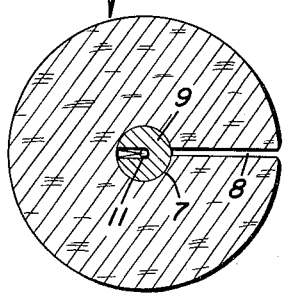
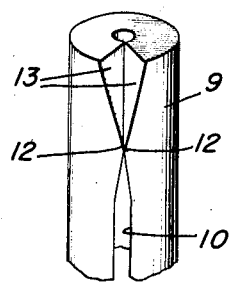
Roy D. Brite
INVENTOR.

United States Patent Office 2,807,907
Patented Oct. 1, 1957

2,807,907

FISHING FLOAT

Roy D. Brite, Beaumont, Tex.

Application July 3, 1956, Serial No. 595,747

1 Claim. (Cl. 43—44.91)

The present invention relates to new and useful improvements in fishing floats and has for its primary object to provide, in a manner as hereinafter set forth, a device of this character which may be expeditiously mounted at any desired point on a line and removed therefrom.

Another very important object of the invention is to provide a fishing float of the aforementioned character which may be either slidable or stationary on the line when in use.

Still another important object of the invention is to provide a fishing float of the character set forth comprising novel means for frictionally securing said float in adjusted position on the line.

Other objects of the invention are to provide a fishing float of the character set forth which will be comparatively simple in construction, durable, compact, attractive in appearance and which may be manufactured at low cost.

These together with other objects and advantages which will become subsequently apparent reside in the details of construction and operation as more fully hereinafter described and claimed, reference being had to the accompanying drawing forming a part hereof, wherein like numerals refer to like parts throughout, and in which:

Figure 1 is a perspective view of a fishing float constructed in accordance with the present invention, showing said float fixedly secured on a line;

Figure 2 is a vertical sectional view, showing the float slidably mounted on the line;

Figure 3 is a view in horizontal section, taken substantially on the line 3—3 of Figure 2; and Figure 4 is a detail view in perspective and on an enlarged scale of the upper end portion of the rotary line retaining shaft or rod.

Referring now to the drawing in detail, it will be seen that the embodiment of the invention which has been illustrated comprises a substantially cylindrical body 5 of suitable buoyant material, preferably cork, said body including a tapered lower portion 6. Extending centrally through the body 5 from end to end thereof is a circular passage or bore 7. The body 5 is further provided with a radial slit 8 which communicates with the bore 7 and which also extends from end to end of said body.

Mounted for rotary adjustment in the bore 7 and extending beyond the ends of the body 5 is a line retaining rod 9 of plastic or other suitable material. The rod 9 is of a diameter to be frictionally retained in the bore 7. Formed longitudinally in the rod 9 and extending from end to end thereof is an open groove or channel 10 for the reception of a fishing line, as indicated at 11. The side walls of the groove or channel 10 comprise substantially closed end portions 12 having longitudinally and radially divergent walls 13 spaced from the bight portion of said groove which facilitate the insertion and slidable retention of the line.

It is thought that the use of the invention will be readily apparent from a consideration of the foregoing. Briefly, to slidably mount the float on a line, as seen in Figure 2 of the drawing, the rod 9 is rotated to bring the groove or channel 10 into registry with the slit 8. The line 11 is then inserted in the groove or channel 10 through the slit 8. This is facilitated, as hereinbefore stated, by the guide portions 13 of the rod 9. The line is forced past the narrowed or restricted portions 12 of the groove 10 and secured thereby in the bight or bottom portion of said groove. The rod 9 is then turned to move the groove 10 out of registry with the slit 8 for retaining the float on the line in an obvious manner. Sliding movement of the float on the line may be limited as desired by knotting said line. When it is desired to fixedly mount the float on the line, said line is inserted in the slit 8 and wedged in the bore 7 between the body 5 and the rod 9 in the manner shown in Figure 1 of the drawing.

Since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

A fishing float comprising an elongated buoyant body of circular cross-section having a longitudinal bore therethrough, and a rod mounted for rotary adjustment in the bore and having a longitudinal groove therein for the reception of a fishing line for removably mounting the body thereon, said body further having a radial slit therein communicating with the bore and registrable with the groove for engaging the line in the latter, the side walls of said groove being spaced from each other through the major portion of their length for the free insertion of the line and terminating in substantially closed, longitudinally and radially outwardly divergent end portions spaced from the bight portion of the groove for inserting and freely slidably securing the line therein.

References Cited in the file of this patent

UNITED STATES PATENTS

| | | |
|---|---|---|
| 771,263 | McCord | Oct. 4, 1904 |
| 2,315,048 | Croft | Mar. 30, 1943 |
| 2,504,241 | Wulff | Apr. 18, 1950 |